Patented Sept. 21, 1926.

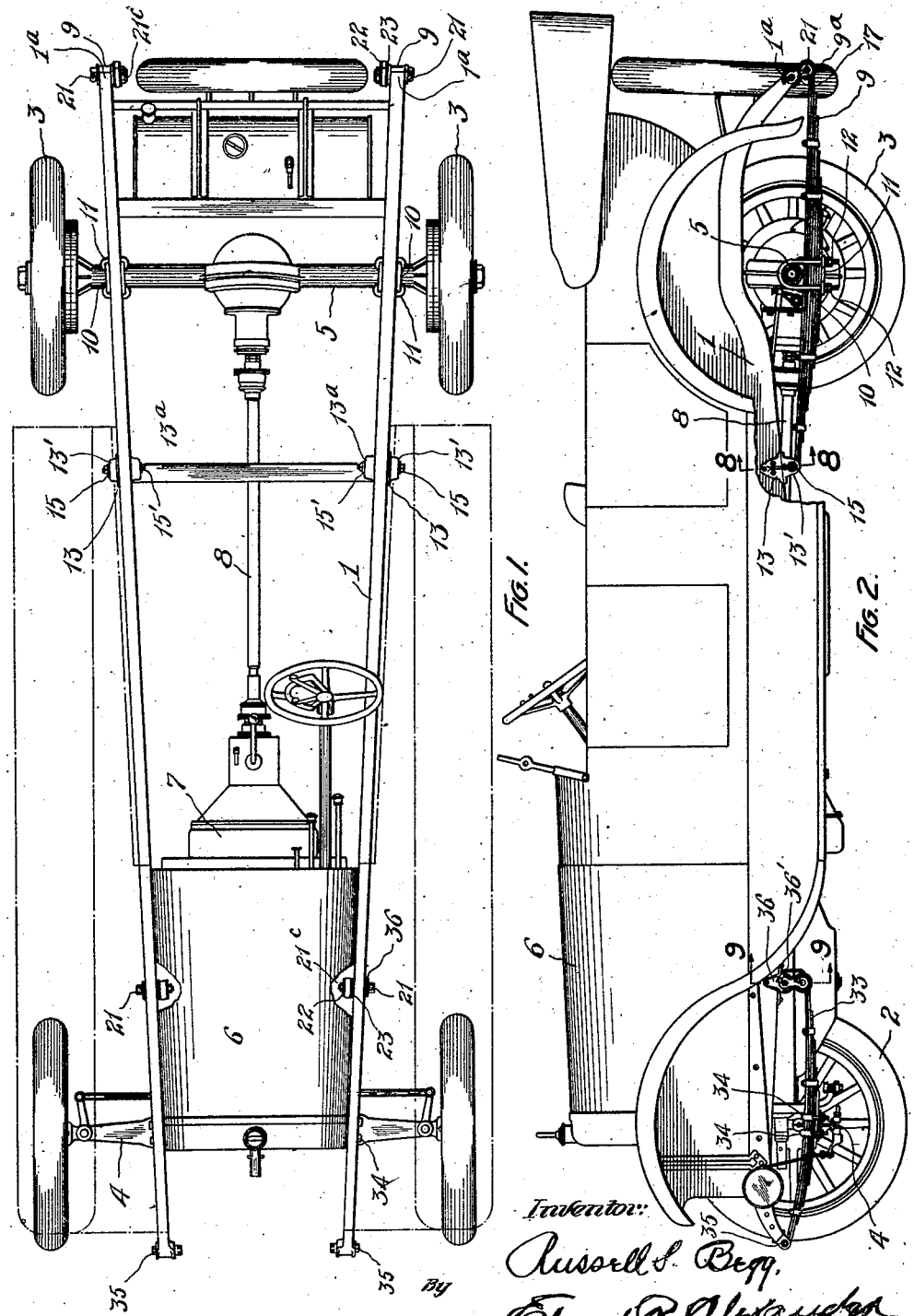

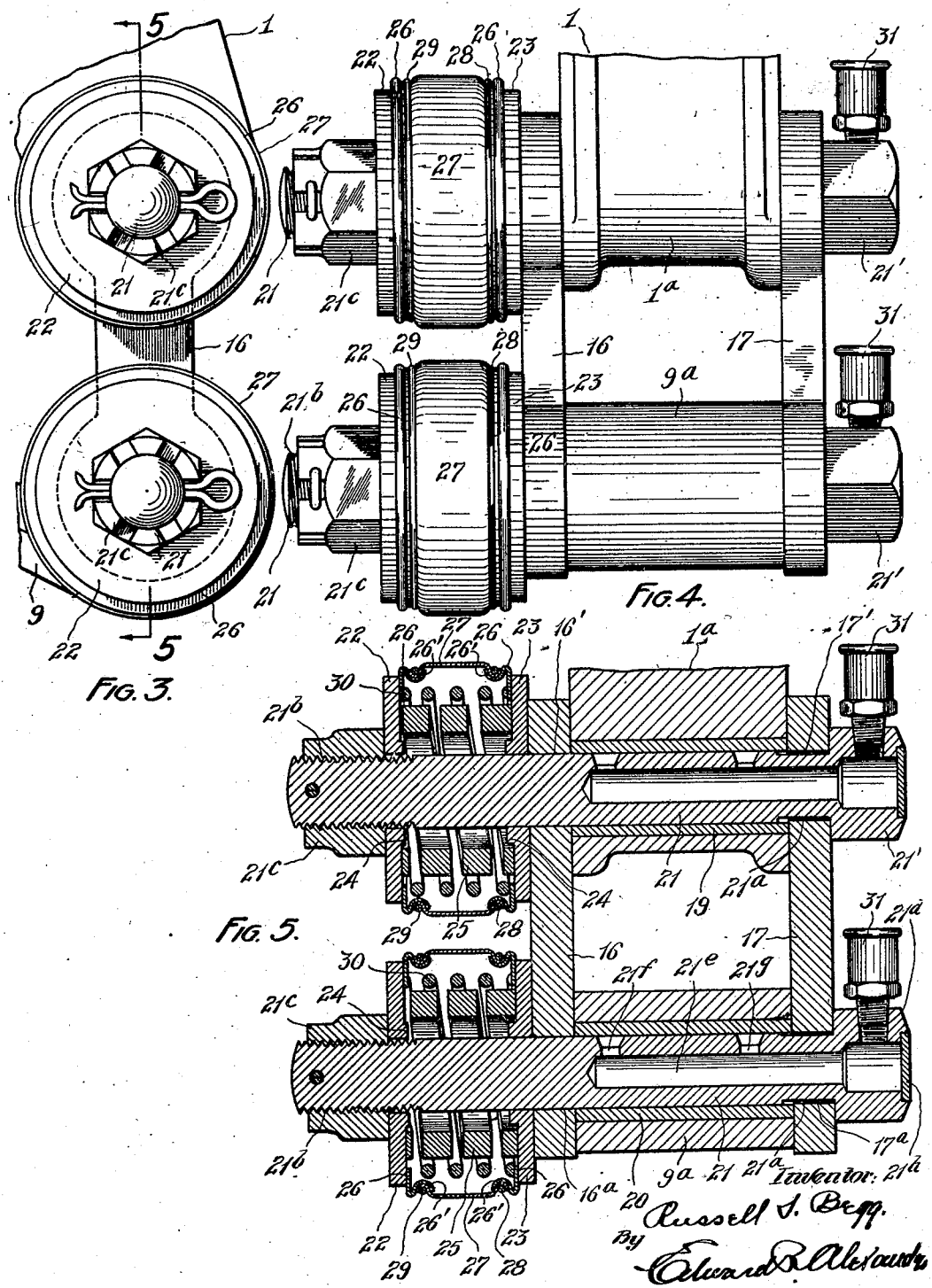

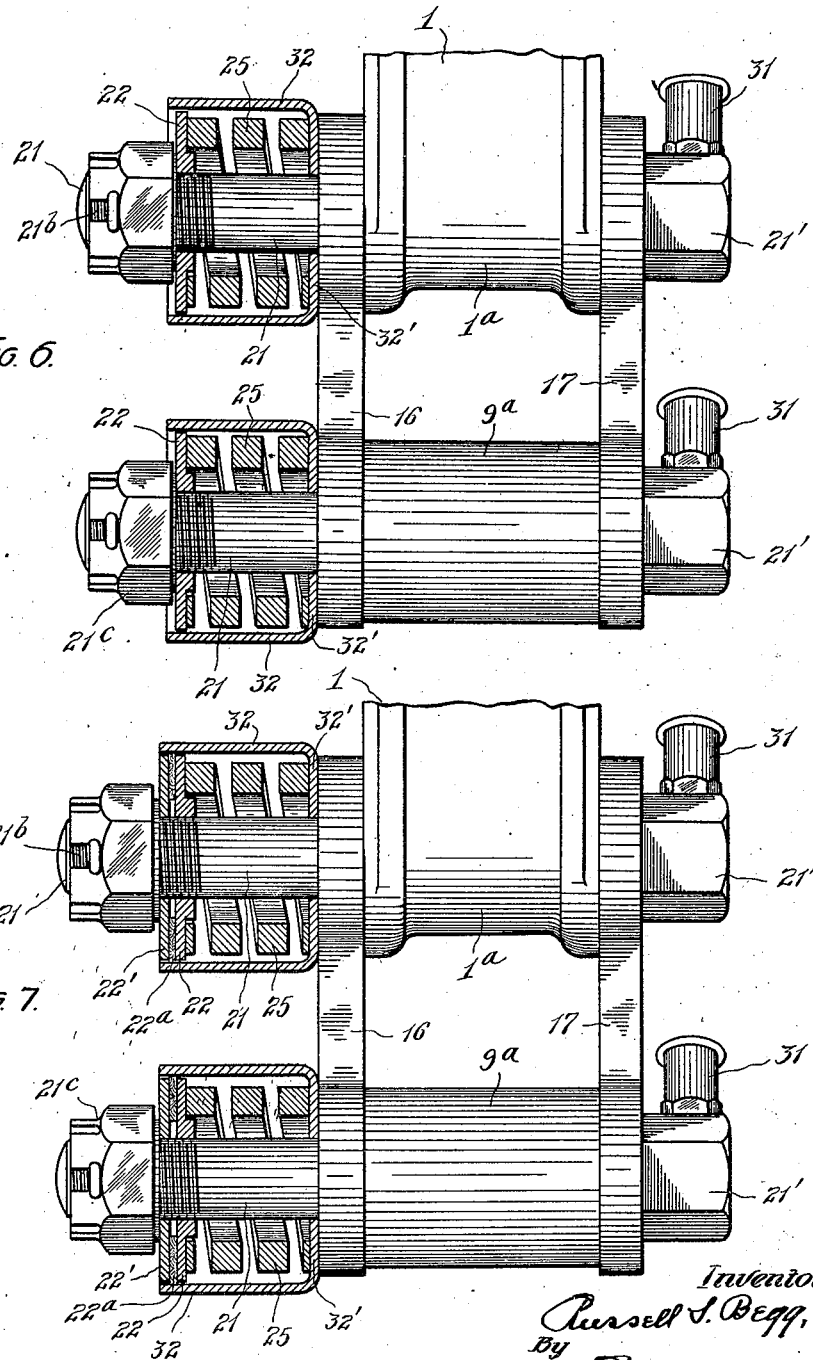

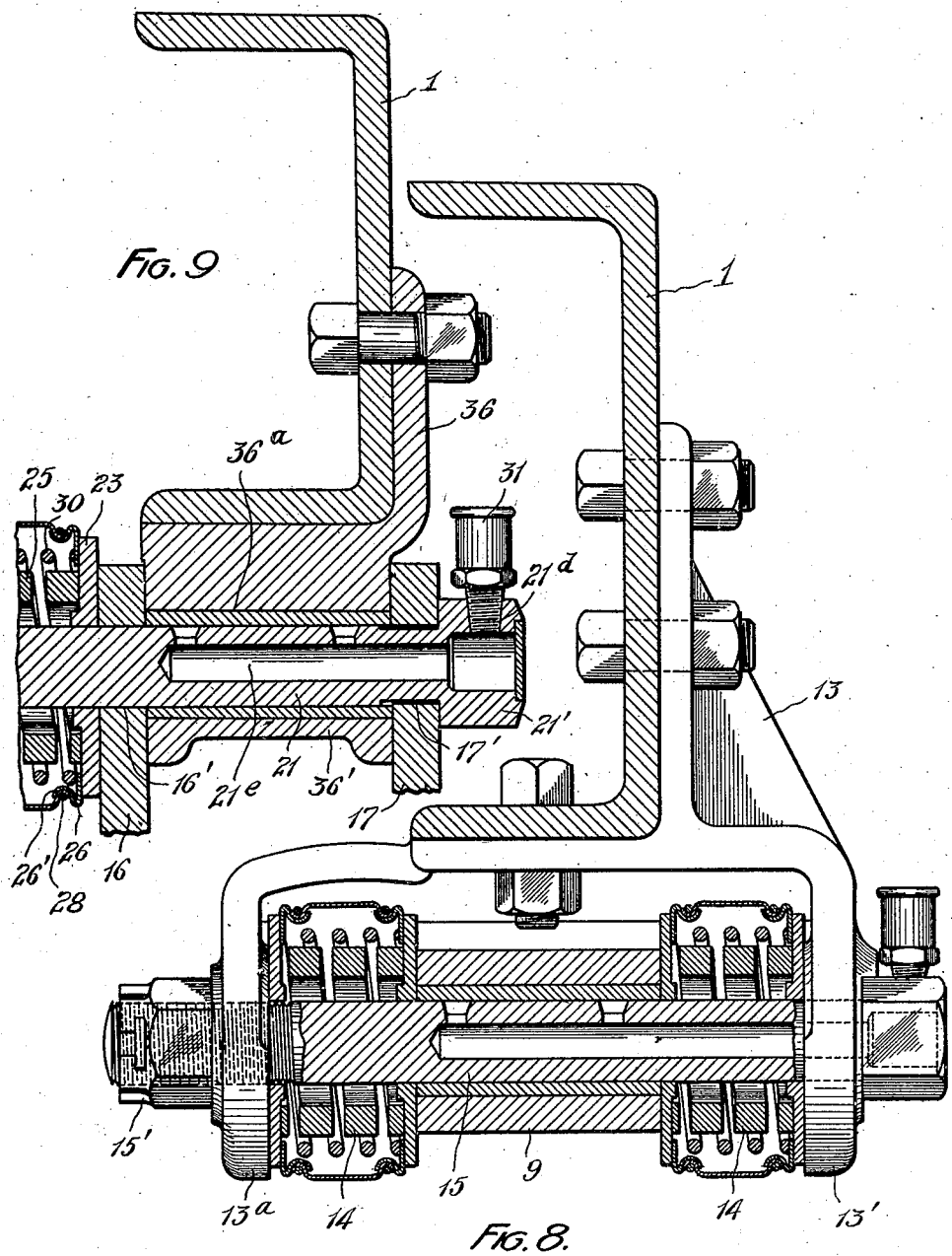

1,600,953

UNITED STATES PATENT OFFICE.

RUSSELL S. BEGG, OF CLEVELAND, OHIO, ASSIGNOR TO UNION TRUST COMPANY, OF CLEVELAND, OHIO, A CORPORATION OF OHIO.

RUNNING-GEAR CONSTRUCTION.

Application filed December 16, 1920. Serial No. 431,071.

This invention relates to vehicle running gear construction, more particularly adapted for passenger motor vehicles.

It is becoming more and more essential in high grade passenger motor vehicles that the same should operate, and continue to operate substantially indefinitely, with a relatively great degree of quietness. One of the problems which has confronted the automotive engineer in connection with high grade passenger cars in particular has been to provide means for connecting the ends of the springs to the frame of the vehicle in a simple, efficient and economical manner which would be durable, on the one hand, and remain quiet substantially indefinitely, on the other.

One of the objects of my invention has been to provide a running gear construction, particularly for passenger motor vehicles, in which the connections between the axles, spring and frame will be such as materially to absorb side shocks between these parts and at the same time preclude rattling or slapping of the parts under normal operation substantially indefinitely.

Another of the objects of my invention has been to provide a construction for spring shackling for passenger motor vehicles in particular which will be relatively cheap, of easy assembly, great durability and possessed of characteristics which will insure quiet operation of the associated parts practically indefinitely.

A further object of my invention is to provide spring shackling mechanism between the springs and frame of a motor vehicle in which wear and tear between the spring shackles and the parts to which they are pivotally connected will be automatically taken up during normal operation of the vehicle.

Other objects of my invention will be clear from a description of constructions embodying it, herein selected for the purpose of illustration.

Fig. 1 is a plan view of a motor vehicle running gear constructed according to my invention.

Fig. 2 is a side elevation of the same with the wheels on the inner side removed, more clearly to disclose the front and rear springs.

Fig. 3 is an end elevation, enlarged, of a spring shackle construction embodying my invention.

Fig. 4 is a rear elevation of the parts shown in Fig. 5.

Fig. 5 is a section on the line 5—5 of Fig. 3.

Fig. 6 is a view, partly in elevation and partly in section, of a modified form of construction.

Fig. 7 is an elevation, partly in section, of still another modified form of construction.

Fig. 8 is a vertical longitudinal section on line 8—8 of Fig. 2 through the axis of the spring bolt for the front end of a rear spring.

Fig. 9 is a vertical longitudinal section on line 9—9 of Fig. 2 through the axis of the spring bolt for the rear end of a front spring.

In the drawings, 1 indicates a motor vehicle frame of any suitable construction. 2 designates a front wheel and 3 the rear wheels of the motor vehicle. They may be of any suitable construction. The front wheels are mounted on a suitable front axle 4 and the rear wheels are mounted on a suitable rear axle 5. These axles, respectively, may be of any preferred form of construction. The rear axle 5 is operatively connected to an engine, not shown, arranged under the hood 6 at the front end of the vehicle through the instrumentality of a transmission 7 of any suitable construction and a propeller shaft 8. For the purpose of having the drawings unencumbered with a lot of detail parts, not necessary for the understanding of this invention as it is used in connection with a motor vehicle, all such detail parts, including brake rods and mountings, for example, are not shown.

9 indicates the rear springs for the vehicle, each of which near its center may be secured to the adjacent tubular part of the rear axle 5 in any suitable manner as by means of U-shaped clips 10, plates 11 and nuts 12. The front end of each spring 9 is preferably connected to the adjacent side member of the frame 1 by mechanism which will allow for the proper action of the spring while at the same time insuring that any wear and tear on the parts of such mechanism will not permit the same to rattle or make other objectionable noises. For this purpose I prefer to use a bracket 13 rigidly secured to the frame in any suitable manner. Each such bracket has two depending arms 13', 13ª, suitably spaced from each other to receive between them not only the front end of a spring 9 but also a couple of coiled springs 14, each interposed between the front end of said spring 9 and one of the said arms of the bracket 13. A bolt 15 extends through the arms 13', 13ª, the coiled springs 14 and the front end of the spring 9 and is provided with a nut 15', by means of which construction the parts are held in proper relationship to each other. This mechanism permits the come and go of the front end of the spring 9 toward and from either of the arms 13', 13ª, as occasion demands in the normal operation of the vehicle, without permitting any noticeable noise as the result of such action. I do not claim to be the inventor of this mechanism per se for connecting the front end of the spring to the frame.

The rear end of each spring 9 is connected with the adjacent rear end of a side member of the frame 1 by means of shackle mechanism embodying my invention. The form of this mechanism illustrated in Figs. 1 to 5, inclusive, comprises a pair of shackle plates 16, 17. Each of the plates 16 is formed near its upper end with a hole 16' and near its lower end with a hole 16ª, while each of the plates 17 is formed near its upper end with a hole 17' and near its lower end with a hole 17ª, the walls of the holes 17', 17ª being serrated for a purpose to be hereinafter described. At its rear end each side frame member carries a tubular section 1ª which may be suitably bushed with a bushing 19. The rear end of each spring 9 is formed into a tubular portion 9ª which likewise may be provided with a suitable bushing 20. The tubular part 1ª of the frame and portion 9ª of the adjacent rear spring are arranged in vertical alignment with each other, preferably with a shackle plate 17 in engagement therewith and on the outside thereof, and a shackle plate 16 in engagement therewith and on the inside thereof, with the holes 16', 17' in alignment with the hole through the bushing 19 and the holes 16ª, 17ª, in alignment with the hole through the bushing 20.

21 are bolts each having a head 21', a knurled section 21ª, and a screw-threaded section 21ᵇ. One of these bolts is extended through the hole 17', the bushing 19 and hole 16' and another of them is extended through the hole 17ª, bushing 20 and hole 16ª, the inner walls of the heads 21' of the bolts being in engagement with the outer wall of the shackle plate 17. The free end of each bolt extends beyond the outer wall of the shackle plate 16 for a sufficient distance to allow for the mounting thereon of a pair of washers 22, 23, the latter preferably being in engagement with the outer wall of the shackle plate 16. Each of these washers is formed with a boss 24 which in the assembly on the bolt are opposed to each other. 25 is a coiled spring surrounding the bolt 21 and bearing at its inner end against the washer 23 and at its outer end against the washer 24. This spring is preferably relatively heavy and capable of withstanding considerable loads, depending upon the thrusts to which it is subjected. For example, in practice I may use a spring capable of withstanding loads considerably upwards of two hundred and twenty-five pounds to the square inch, although under certain circumstances lighter springs may be employed. 21ᶜ is a castellated nut engaging the screw threads 21ᵇ of the bolt 21 and the outer wall of the washer 22. By screwing up on this nut, the shackle plates will be drawn into snug engagement with the walls of the section 1ª of the frame or 9ª of the spring, as the case may be, and the spring 25 may be put under compression so as to insure that all parts of the mechanism will, under all ordinary operating conditions, be held in proper operating relationship to each other and in such manner that there will be no rattling of such parts or noise made due to slapping together of the parts in the normal operation of the motor vehicle.

I prefer to encase the spring 25 and for this purpose have shown a dust shield structure comprising a pair of sheet metal cap pieces 26 each provided with an annularly grooved flange 26', two of such pieces 26 being disposed between the washers 22, 23, with their flanges 26' extending toward each other. 27 is a cylinder of flexible material such as artificial leather which extends between the cap pieces 26, 26, and has its inner end pressed into the adjacent annular recess 26' by means of a wire band 28 and its outer end similarly pressed into the adjacent annular recess 26' by another wire band 29. 30 is a coiled spring bearing at its inner end against the innermost cap piece 26 and at its outer end against the outermost cap piece 26 and serving to hold the said pieces in engagement with the adjacent washers 23, 22, respectively, in the normal operation of the device.

In order to prevent each bolt turning with relation to the shackle plates and to provide that they and the bolt will oscillate in normal action with relation to the associated bushing 19 or 20, as the case may be, the serrations of the knurled section 21ª of the bolt are intermeshed with the serrations of the portions 17' or 17ª, as the case may be, of the shackle plate 17. Each bolt 21 may be provided with an oiling system as by means of a hole 21ᵈ formed in the bolt head communicating at its inner end with a hole 21ᵉ disposed longitudinally in the bolt from which lead ducts 21ᶠ, 21ᵍ. A suitable oil receiving device of any well known character, such as the one illustrated at 31, may be fitted into the hole 21ᵈ and the outer end of the hole 21ᵉ may be closed by a plug 21ʰ.

In the modified form of construction illustrated in Fig. 6, the spring 25 is disposed about the bolt 21 and within a metallic cover 32, which has a wall 32', through which the bolt extends and which wall engages with the adjacent shackle plate 16. The washer 22 in this instance is fitted within the cover 32 and is free to come and go with respect to the walls thereof.

In the further improvement illustrated in Fig. 7, in addition to the washer 22, I provide another washer 22' and between these washers an annular packing collet or gasket 22ᵃ, serving to make the closure for the spring 25 substantially dust-proof and reasonably lubricant-tight.

It will be noted that the mounting of the rear spring at each end thereof is such as to absorb materially through the instrumentality of the associated coiled springs side shocks either from the frame to the spring and thence to the rear axle or vice versa, in this respect providing a cushioning action for such shocks of material importance in the matter of comfort in riding to passengers and of wear and tear of the various parts subjected to such shocks.

It will be further noted that the construction of the spring shackle mechanism is such and the pressure under which the springs 25 are adjusted is such, that any wear and tear on the parts of the mechanism which would otherwise tend to establish a loose fit between such parts, is automatically taken up and compensated for, insuring that all such parts will be kept in proper working engagement with each other and that no noise or slap will be set up by their rattling together or striking each other in the normal operation of the mechanism. This automatic takeup feature is further of advantage in getting the parts of the mechanism to operate properly with relation to each other, in the event that in the first instance in their manufacture slight irregularities should exist. Such irregularities will be worn down or off and the parts brought into proper mechanical relation to each other under the influence of the pressure exerted by the springs 25.

With respect to the mounting of the front springs, I have found it preferable to secure them adjacent their centers to the front axle 4 in any well known manner as by means of spring clips 34. The front end of each front spring is preferably snugly fitted between the bifurcated adjacent front end of a frame side member and is pivotally held in place by a suitable spring bolt 35. The rear end of each front spring is preferably shackled to a bracket 36 rigidly secured to the adjacent side frame member. This bracket 36 has a depending portion 36' having a horizontally disposed hole 36ᵃ through it and is connected to the rear end of the adjacent front spring 33 by a shackle, bolt and spring construction of the same character as the corresponding parts used to connect the rear end of the frame with the rear end of the adjacent rear spring. This connection for the rear end of the front spring will also serve as a shock absorber for side shocks between the front axle and the frame in so far as the transmission thereof through the rear ends of the front springs is concerned.

With a chassis mounted as hereinbefore described, I have found that the shackling mechanism will remain quiet in actual practice under the most severe conditions and that the mechanism is peculiarly advantageous for bringing about the desired quietness of operation in passenger cars in particular and furthermore that the riding qualities of the chassis are greatly enhanced.

It will be further noted that the joints between the shackles and the eyes in my improved construction are maintained substantially lubricant-tight and dust-proof, which is of distinct advantage in insuring the prolonged life of the parts and their quiet operation.

It will be further noted that under the influence of the action of the springs, the spring shackles and the eyes to which they are connected at their opposite ends are maintained in frictional resistance so as to produce a snubbing or shock absorbing action between these parts in the normal operation of the vehicle.

Furthermore, it will be noted that the locking together of the shackles and correlated eyes by the screwing up of the nuts, as occurs so commonly with the usual bolt and nut connections for these parts, is substantially precluded, the springs serving largely to prevent such locking together.

To those skilled in the art of making mechanism of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In running gear construction for motor vehicles, the combination with a frame, an axle and a spring interposed between said frame and said axle, of shackling mechanism connecting one end of said spring to said frame and comprising a pair of shackle plates one arranged at either side of said spring, bolts for pivotally connecting adjacent ends of said shackles with the frame and spring, respectively, a coiled spring surrounding each bolt adjacent one of said shackle plates, means carried by the bolt for compressing said spring and drawing together the shackle plates and parts associated therewith and holding them in engagement with each other against rattling or slapping under normal operation including a washer and a nut, and a cover for encasing said coiled spring and washer and having a substantially dust-proof engagement with the periphery of said washer.

2. In running gear construction for motor vehicles, the combination with a frame, an axle and a spring interposed between said frame and said axle, of shackling mechanism connecting one end of said spring to said frame and comprising a pair of shackle plates one arranged at either side of said spring, bolts for pivotally connecting adjacent ends of said shackles with the frame and spring, respectively, a coiled spring surrounding each bolt adjacent one of said shackle plates, means carried by the bolt for compressing said spring and drawing together the shackle plates and parts associated therewith and holding them in engagement with each other against rattling or slapping under normal operation, and a substantially dust-proof cover for encasing said coiled spring.

3. In running gear construction for motor vehicles, the combination with a frame, an axle and a spring interposed between said frame and said axle, of shackling mechanism connecting one end of said spring to said frame and comprising a pair of shackle plates one arranged at either side of said spring, bolts for pivotally connecting adjacent ends of said shackles with the frame and spring, respectively, a coiled spring surrounding each bolt adjacent one of said shackle plates, means carried by the bolt for compressing said spring and drawing together the shackle plates and parts associated therewith and holding them in engagement with each other against rattling or slapping under normal operation, including a washer having a dust-proofing disk and a cover separable from the adjacent spring shackle and bearing thereagainst, enclosing said coil spring and washer and having substantially dust-proof contact with said dust-proofing disk.

4. In spring shackling mechanism for vehicles, the combination with a shackle bolt, of a pair of shackle plates, one arranged at either side of a vehicle spring, a coiled spring surrounding the bolt adjacent one of said shackle plates, means carried by the bolt for compressing the coiled spring and drawing together the shackle plates and parts associated therewith, and a cover engaging a shackle plate and enclosing the coiled spring, said cover having one end adapted to form a seat for one end of said coiled spring, and said spring compressing means having a substantially tight engagement with the other end of the cover.

5. In spring shackling mechanism for vehicles, the combination with a shackle bolt, of a pair of shackle plates, one arranged at either side of a vehicle spring, a coiled spring surrounding the bolt adjacent one of said shackle plates, a nut for the bolt, a washer actuated by the nut for compressing the coiled spring, and a cover bearing against the shackle plate and having a portion forming a seat for one end of the spring, said cover enclosing the spring and washer and forming with the latter a substantially tight joint.

In testimony whereof I affix my signature.

RUSSELL S. BEGG.